(12) United States Patent
McCloskey et al.

(10) Patent No.: US 10,556,752 B1
(45) Date of Patent: Feb. 11, 2020

(54) STACKER WITH WHEEL ASSEMBLY

(71) Applicants: James Paschal McCloskey, Keen (CA); Al Nottingham, Keen (CA)

(72) Inventors: James Paschal McCloskey, Keen (CA); Al Nottingham, Keen (CA)

(73) Assignee: McCloskey International Limited, Keen, Ontario (CA)

( * ) Notice: Subject to any disclaimer, the term of this patent is extended or adjusted under 35 U.S.C. 154(b) by 0 days.

(21) Appl. No.: 16/203,379

(22) Filed: Nov. 28, 2018

(51) Int. Cl.
*B65G 21/14* (2006.01)
*B65G 65/28* (2006.01)
*B65G 41/00* (2006.01)

(52) U.S. Cl.
CPC ........... *B65G 41/008* (2013.01); *B65G 21/14* (2013.01); *B65G 41/002* (2013.01); *B65G 65/28* (2013.01)

(58) Field of Classification Search
CPC ...... B65G 21/14; B65G 65/28; B65G 41/008; B65G 41/002
USPC ................. 198/302, 303, 311, 312, 313, 315
See application file for complete search history.

(56) References Cited

U.S. PATENT DOCUMENTS

| | | | |
|---|---|---|---|
| 3,552,546 A * | 1/1971 | Rath ...................... | B65G 21/14 198/306 |
| 4,135,614 A * | 1/1979 | Penterman ........... | B65G 41/008 198/306 |
| 4,245,732 A * | 1/1981 | Couperus ............... | B65G 21/14 198/313 |
| 4,427,104 A * | 1/1984 | Reid, Jr. .............. | B65G 41/002 198/306 |
| 5,515,961 A | 5/1996 | Murphy et al. | |
| 5,833,043 A * | 11/1998 | Schmidgall .......... | B65G 41/008 198/302 |
| 6,311,821 B1 | 11/2001 | Douglas | |
| 6,591,971 B1 * | 7/2003 | Sheahan ............. | A01F 25/2027 198/304 |

(Continued)

FOREIGN PATENT DOCUMENTS

| | | |
|---|---|---|
| CA | 1100083 | 4/1981 |
| EP | 2883819 | 6/2015 |
| WO | 2018/106533 | 6/2018 |

*Primary Examiner* — Douglas A Hess
(74) *Attorney, Agent, or Firm* — Schwabe, Williamson & Wyatt, P.C.

(57) ABSTRACT

A tracked mobile radial stacker is provided that includes a conveyor having a rear end with a pivot pad, a $5^{th}$ wheel connection, a hopper for receiving bulk material to be stacked, and a forward portion designed to discharge the bulk material to form a stack. Also included are a continuous track mounted to a frame, and a pair of pivotable wheels mounted to the frame, the pivotable wheels being pivotable between raised and lowered positions and being radially disposed when in the lowered position. An arm may be mounted between the frame and the forward portion of the conveyor, the arm having an underside. A bogey may be mounted to the underside of the arm, the bogey including a plurality of longitudinally-disposed bogey wheels. The pivotable wheels may raise the tracks off the ground when the pivotable wheels are in the radially-disposed, lowered position to facilitate radial shifting of the conveyor with the conveyor pivoting on the pivot pad to form an arc-shaped stack, and when the bogey is in its lowered position the continuous track may be elevated off the ground.

15 Claims, 7 Drawing Sheets

(56) References Cited

U.S. PATENT DOCUMENTS

| | | | | |
|---|---|---|---|---|
| 6,929,113 B1* | 8/2005 | Hoover | ............... | B65G 21/14 |
| | | | | 198/313 |
| 7,108,124 B2* | 9/2006 | Bernard | ............... | B65G 41/008 |
| | | | | 198/508 |
| 7,284,650 B2* | 10/2007 | Hoffmann | ............... | B65G 41/008 |
| | | | | 198/303 |
| 7,448,486 B1* | 11/2008 | Frankl | ............... | B65G 15/26 |
| | | | | 198/313 |
| 7,455,173 B1* | 11/2008 | Fridman | ............... | B65G 21/14 |
| | | | | 198/302 |
| 8,584,826 B2* | 11/2013 | Smith | ............... | B65G 41/008 |
| | | | | 198/302 |
| 8,739,956 B2* | 6/2014 | Smith | ............... | B65G 41/008 |
| | | | | 180/6.48 |
| 10,183,811 B1* | 1/2019 | McCloskey | ............... | B65G 41/008 |
| 10,414,598 B2* | 9/2019 | McCloskey | ............... | B65G 67/606 |
| 10,414,599 B2* | 9/2019 | McCloskey | ............... | B65G 41/008 |
| 2012/0219391 A1 | 8/2012 | Teichrob | | |
| 2018/0265302 A1 | 9/2018 | McCloskey et al. | | |

\* cited by examiner

STACKER WITH WHEEL ASSEMBLY

TECHNICAL FIELD

Embodiments herein relate to the field of mobile bulk material stackers.

BACKGROUND

Radial stackers have been used for many years to stack bulk materials such as aggregate for road construction, grain and coal. Radial stackers, which swing around in a radius to stack material in an arc, permit substantially more material to be stacked than is possible using a conventional stationary stacker that permits only a conical stack. Telescoping radial stackers permit even more material to be stacked as the stacker is extended or retracted during conveying operations.

Radial stackers typically include a wheels or tracks disposed between a hopper and the top of the stacker from which the material is discharged. These wheels or tracks permit the stacker to be maneuvered around the work site or can be swung in an arc, with the hopper including a pivot plate on which the stacker pivots. Whether wheels or tracks are used, portable radial stackers may be folded over themselves and be ready for road transport in relatively little time. If wheels are used, the wheels can be displaced into a position aligned with the stacker to support the stacker for travel down the highway. In that instance, the same wheels that support the stacker during stacking operations can be used to support the stacker above the road. In the event tracks are used in place of wheels, the stackers are folded over themselves and then typically are driven onto a flatbed truck to be conveyed to the next work site.

In either event, whether a wheeled or track system is utilized, it is critical that, when the conveyor is folded over itself, the profile of the stacker be as low as possible due to highway requirements and the desire to avoid extra fees and trouble for having a high load. However, given that the engine that drives the hydraulic systems for the conveyor is typically disposed above the drive, whether it be wheeled or tracked, this requires the height of the folded conveyor to be higher than if the drive engine, drive pulleys and hydraulic systems were placed somewhere else on the conveyor.

In recent years, tracked drives have been used in quarries, agricultural and mining operations to enable equipment to be moved over harsh terrain for ideal positioning for stacking operations. While tracked vehicles have proven to be of great benefit for such purposes, the use of tracks instead of wheels makes it more difficult to shift a stacker radially to facilitate the stacking of material in an arc instead of a cone. Also, because tracked vehicles are not typically permitted to be driven on road surfaces, they are normally loaded onto flatbed trucks for transit from one work site to another. These two drawbacks with the use of tracks has to a certain extent limited the use of tracked vehicles.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
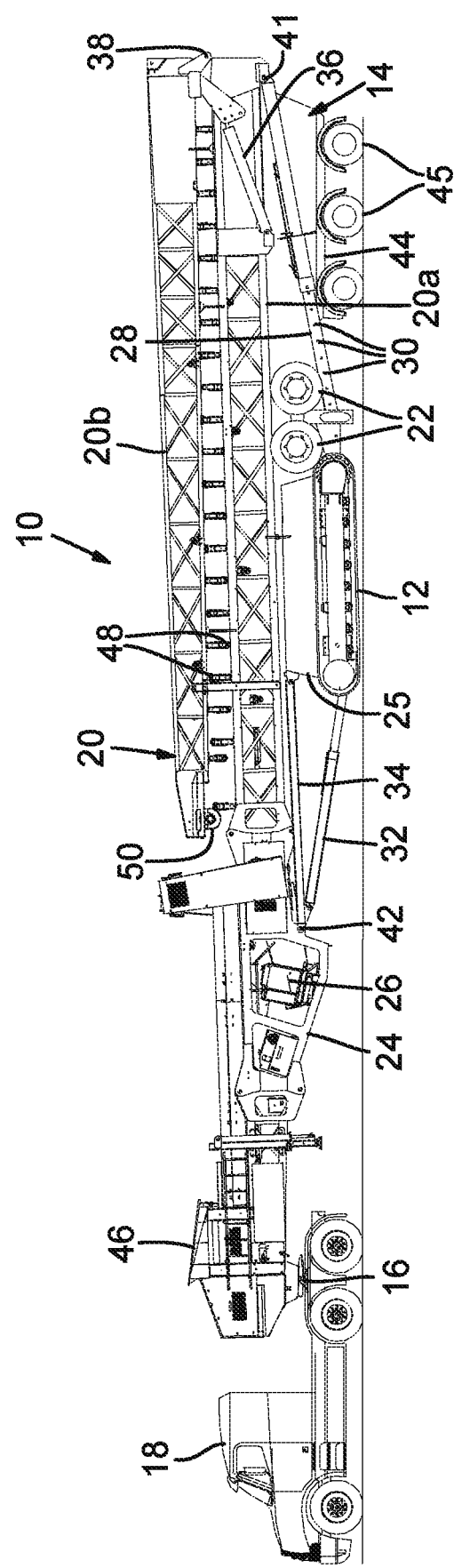
FIG. 1 is a side elevation view of a first embodiment, depicting the stacker in a disposition ready to be conveyed down a roadway.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

A tracked, portable stacker is provided for stacking bulk material. The stacker may include a linear conveyor having a rear portion and a front portion and be designed to carry bulk material from the rear portion to the front portion. A continuous track system includes a frame to which the conveyor is mounted, the track system having a pair of driven, parallel tracks. A powered, telescoping cylinder arm may be mounted between the frame and the front portion of the conveyor for adjusting the front portion of the conveyor between a lowered position for transport and a raised position for stacking operations. In the lowered position, the conveyor may be generally horizontal. A bogey may be mounted to the telescoping cylinder arm, the bogey including a plurality of longitudinally disposed wheels designed to be raised off the ground when the front portion of the conveyor is in a raised position, and lowered to the ground when the front portion of the conveyor is in a lowered position, wherein the bogey wheels elevate the tracks off the ground when the front portion of the conveyor is in the lowered position and the bogey wheels are in position to facilitate the stacker being conveyed down a roadway.

The stacker may also include a pair of pivotable wheels that can pivot between a raised position in which they are off the ground and a lowered position in which they rest on the ground, and when the front portion of the conveyor is in a raised position and the pivotable wheels are in their lowered position, the pivotable wheels raise the tracks off of the ground so that they stacker can be radially conveyed to stack material in an arc. A powered system is normally provided for transitioning the pivotable wheels between the raised and lowered positions.

The pivotable wheels may be swiveled when in a raised position between longitudinally- and radially-disposed positions. The stacker may also include a rearwardly-extending hydraulic cylinder system extending between the frame and the rear portion of the conveyor. The stacker may be in a substantially horizontal disposition when the front portion of the conveyor is in its lowered position.

Alternatively, a portable radial stacker may be provided for stockpiling bulk material. The stacker may include a conveyor having a rear portion and a front portion and being designed to carry bulk material from the rear portion to the front portion. A pair of pivotable wheels may be mounted to a frame that are pivotable between a raised position in which the pivotable wheels are off the ground and a lowered position in which the pivotable wheels rest on the ground to enable the stacker to be radially conveyed to stack material in an arc. A powered, telescoping cylinder arm may be mounted between the frame and the front portion of the conveyor to selectively adjust the front portion of the conveyor between lowered and raised positions. A bogey may be mounted to the telescoping cylinder arm, the bogey including a plurality of longitudinally-disposed wheels designed to be raised off the ground when the front portion of the conveyor is adjusted to the raised position, and lowered to the ground when the front portion of the conveyor is adjusted to the lowered position. The stacker may also include a continuous track mounted to the frame to selectively support the stacker, wherein the track is elevated off the ground when the pivotable wheels are in their lowered position or the bogey is lowered to the ground.

The embodiments may include a tracked mobile radial stacker that includes a conveyor having a rear end with the following mounted thereto: a pivot pad; a 5th wheel connection; and a hopper for receiving bulk material to be stacked; and a forward portion designed to discharge the bulk material to form a stack. Also included may be continuous track mounted to a frame, and a pair of pivotable wheels mounted to the frame and disposed to each side of the track, the pivotable wheels being pivotable between raised and lowered positions and being radially disposed when in the lowered position. An extendable arm may be mounted between the frame and the forward portion of the conveyor, the arm having an underside. A bogey may be mounted to the underside of the arm, the bogey including a plurality of longitudinally-disposed bogey wheels. The pivotable wheels may raise the tracks off the ground when the pivotable wheels are in the lowered position to facilitate radial shifting of the conveyor with the conveyor pivoting on the pivot pad to form an arc-shaped stack, and when the bogey is in its lowered position, the track may be elevated off the ground. The tracked mobile radial stacker may also include a rearwardly-extending system extending from the frame toward the rear end of the conveyor, and may include a modular system mounted adjacent the rear end of the conveyor for holding an engine, and wherein the rearwardly-extending system is mounted to the modular system.

Another aspect is a stacker for conveying and stacking bulk material. The stacker may include a conveyor frame having two lateral sides and being designed to support a conveyor belt having an upward facing side for carrying a load, the conveyor frame including forward and rear portions. A hopper may be designed to receive the bulk material, the hopper being mounted to the rear portion of the conveyor frame to collect the bulk material and deposit it on the upward facing side of the conveyor belt to create a loaded belt. A tracked drive carriage may be mounted to a carriage frame and supporting the conveyor frame, the drive carriage facilitating relocation of the conveyor frame around a work site, the drive carriage being mounted below and between the forward and rearward portions of the conveyor frame. A pair of pivotable radial wheels may be mounted to the carriage frame and disposed on each lateral side of the conveyor frame, with a powered system for pivoting the radial wheels between raised and lowered positions. A powered arm may be mounted between the carriage frame and the forward portion of the conveyor frame, the arm being extendable for adjusting the forward portion of the conveyor frame upward for stacking operations and being retractable for adjusting the conveyor frame downward to a substantially horizontal position to facilitate relocating the stacker to another site, the arm having an upper side and an underside. A plurality of longitudinally-extending wheels may be rotatably mounted to the underside of the arm such that when the arm is extended, the wheels are elevated off the ground and when the arm is retracted, the wheels contact the ground, thereby lifting the tracked drive carriage off the ground.

In the immediately foregoing system, a drive module may be mounted to the rear portion of the conveyor frame independent of the drive carriage, and an engine may be provided for supplying power to the stacker. In this system, a drive pulley may be provided for pulling the loaded belt in a forward direction from a position adjacent the hopper, with the engine and drive pulley being mounted to the drive module, the engine providing drive power to the drive pulley.

Yet another aspect of the disclosed embodiments is a method for preparing a tracked stacker for stacking operations and for relocation down a roadway. The method may include the following steps, not necessarily in the order recited. A conveyor is selected with a conveyor frame having front, mid and rear portions. A carriage frame having continuous tracks is positioned under the mid portion of the conveyor frame. A powered, extendable arm is mounted between the carriage frame and the mid- or front portion of the conveyor frame, the extendable arm having an upper side and an underside. A plurality of longitudinally-extending wheels are rotatably mounted to the underside side of the extendable arm. The extendable arm is extended to raise the front portion of the conveyor frame to prepare the conveyor frame for stacking operations. When stacking operations are completed, the extendable arm is retracted to lower the front portion of the conveyor frame to a generally horizontal position, causing the longitudinally-extending wheels to contact the ground and elevate the continuous tracks off of the ground, thereby readying the stacker for relocation down a roadway.

The method may also include the step of providing a plurality of radially extending wheels mounted to the carriage frame, the radially extending wheels being pivotable between raised and lowered positions such that when the radially extending wheels are pivoted to their the lowered position they lift the continuous tracks off the ground, permitting the stacker to be radially conveyed to form an arced stack of bulk material.

The method may also include the step of mounting a belt to the conveyor, and driving the conveyor belt from the rear to the front portion of the conveyor, the drive belt being mounted such that the drive pulley is designed to carry a load forwardly to be stacked.

A tracked stacker is identified generally at 10 in the figures. FIG. 1 shows stacker 10 ready to be transported down a roadway with tracks 12 elevated and with the stacker being supported on a wheeled bogey indicated generally at 14. Stacker 10 is supported on the rear end by a fifth wheel connection 16 to a tractor 18. Stacker 10 includes a conveyor, indicated generally at 20, pivotable wheels 22, and a module shown generally at 24. Module 24 is depicted and described in a U.S. patent application entitled Stacker Drive Module, filed Oct. 5, 2017, designated application Ser. No. 15/725,721. That application is incorporated herein by reference. The module supports an engine 26 that provides power, usually hydraulic, for the entire stacker.

Figure 2:
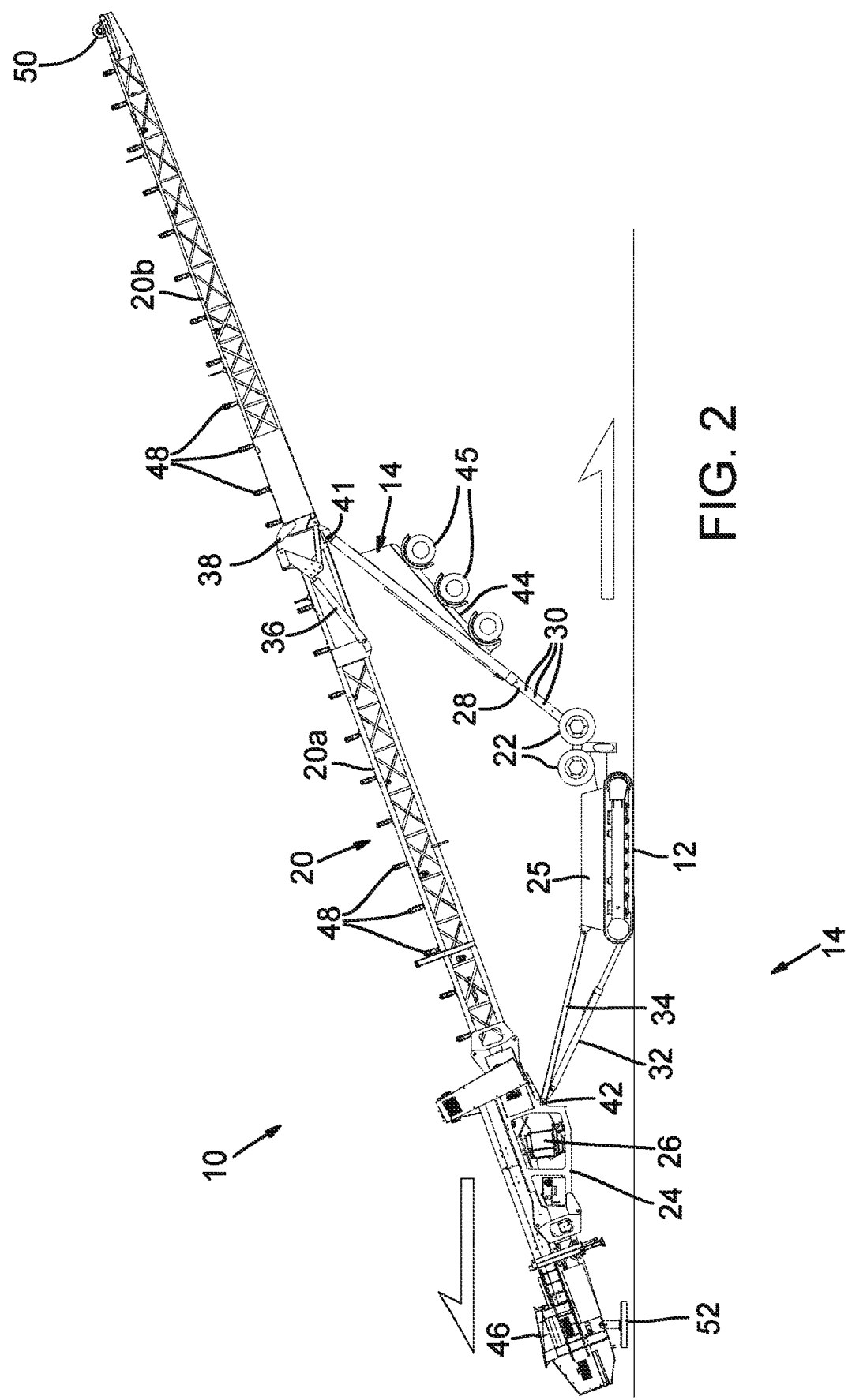
FIG. 2 is a side elevation view of the first embodiment with the conveyor opened to its working position, depicting the stacker in a disposition ready to be moved around the job site with the tracks on the ground and the pivot pad raised off the ground.

A system for elevating conveyor 20 is best shown in FIG. 2, and may include a pair (only one of which shows in FIG. 2 but both of which appear in FIG. 4) of heavy duty, powered, forwardly-extending, telescoping hydraulic cylinder arms 28. Cylinder arms 28 are shown to extend between the underside of the forward portion of the conveyor and the frame 25, which may be considered a track frame, carriage frame or pivotable wheel frame. Arms 28 may have a plurality of spaced holes 30 in order to permit the extent of extension to be locked through the use of conventional pegs (not shown). Arms 28 may also be of other design and need not be hydraulically powered or telescoping as long as they are extendable.

The stacker may also include a pair (again, only one of which shows in FIG. 2 but both of which appear in FIG. 4) of rearwardly-extending telescoping cylinders 32, which also may be hydraulically powered. These rearwardly-extending cylinders 32 typically extend between a pivot 42 at module 24 and track frame 25, although any other conventional system may be provided for ensuring adequate support for the rear portion of the conveyor. A pair of rearwardly-extending supports 34, which are typically not hydraulically powered, are included in the depicted embodiment to provide additional support to the rear portion of the stacker.

Figure 3:
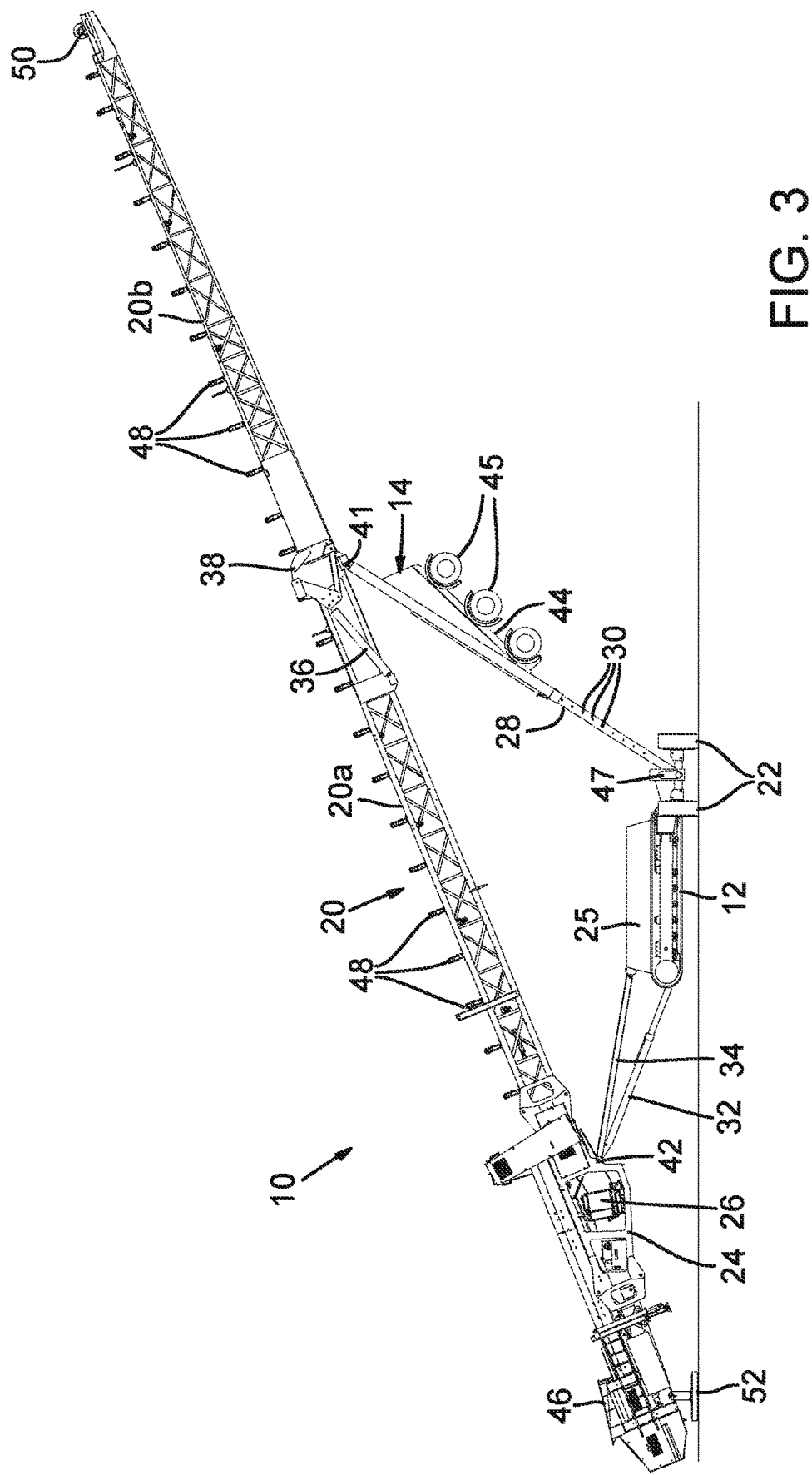
FIG. 3 is a side elevation view of the first embodiment with the conveyor opened to its working position, the pivot pad resting on the ground, and the wheeled bogey elevated, with the stacker in a position ready to be moved radially to stack material in an arc.

FIG. 1 shows that forward conveyor half 20b folds over rearward conveyor half 20a for highway transit. Conveyor half 20b is extended to the operating position depicted in FIGS. 2-4 through the use of a pair of hydraulic folding cylinders 36, which cause the forward conveyor half 20b to pivot or fold on a conveyor joint 38. Folding cylinders 36 also facilitate the folding of forward conveyor half 20b to the retracted position depicted in FIG. 1.

Figure 4:
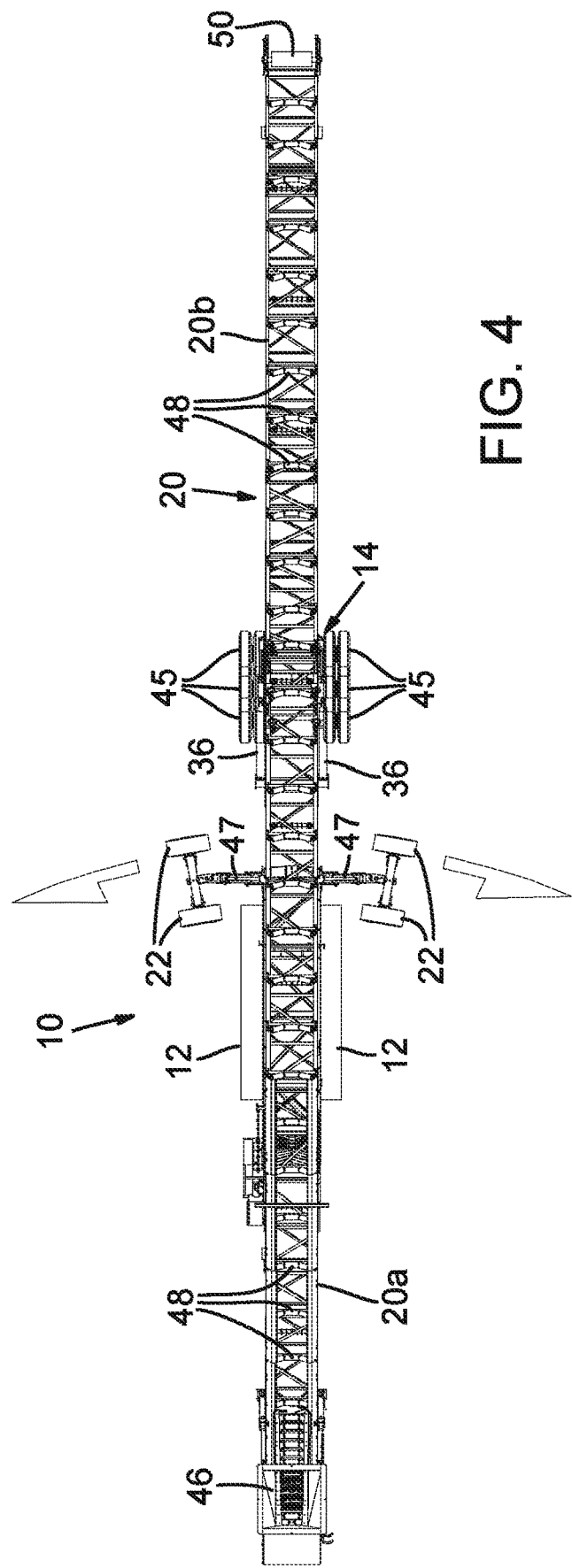
FIG. 4 is a top plan view of the first embodiment, with the stacker in the position depicted in FIG. 3.

Forwardly-extending hydraulic cylinder arms 28 are typically of heavy duty construction, as they may be designed to carry wheeled bogey 14. Arms 28 may extend between frame 25 and a pivot 41 mounted to the underside of the forward end of conveyor half 20b. Bogey 14 normally includes a bogey frame 44 with a plurality of bogey wheels 45 disposed to each lateral side of conveyor 20. Three pairs of wheels are included in the depicted embodiment and, as shown in FIG. 4, these are each double wheels. The number of such wheels depends on the application of the particular stacker and the loads that it is designed to handle. As shown in FIG. 1, bogey 14 should be heavy-duty enough that it can support the entire weight of the forward portion of the stacker but should be sufficiently light that it can be supported by arms 28 when in the elevated position. In order to keep weight to a minimum, bogey 14 and its wheels are typically not powered.

Pivotable wheels 22 are shown in their stowed, raised position in FIGS. 1 and 2, swiveled to be in longitudinal alignment with the stacker for road transit. This not only reduces wind resistance but also keeps the width of the stacker to a minimum. Wheels 22 may alternatively be referred to herein as radial wheels, as they provide a radial drive capability to the stacker.

Figure 6:
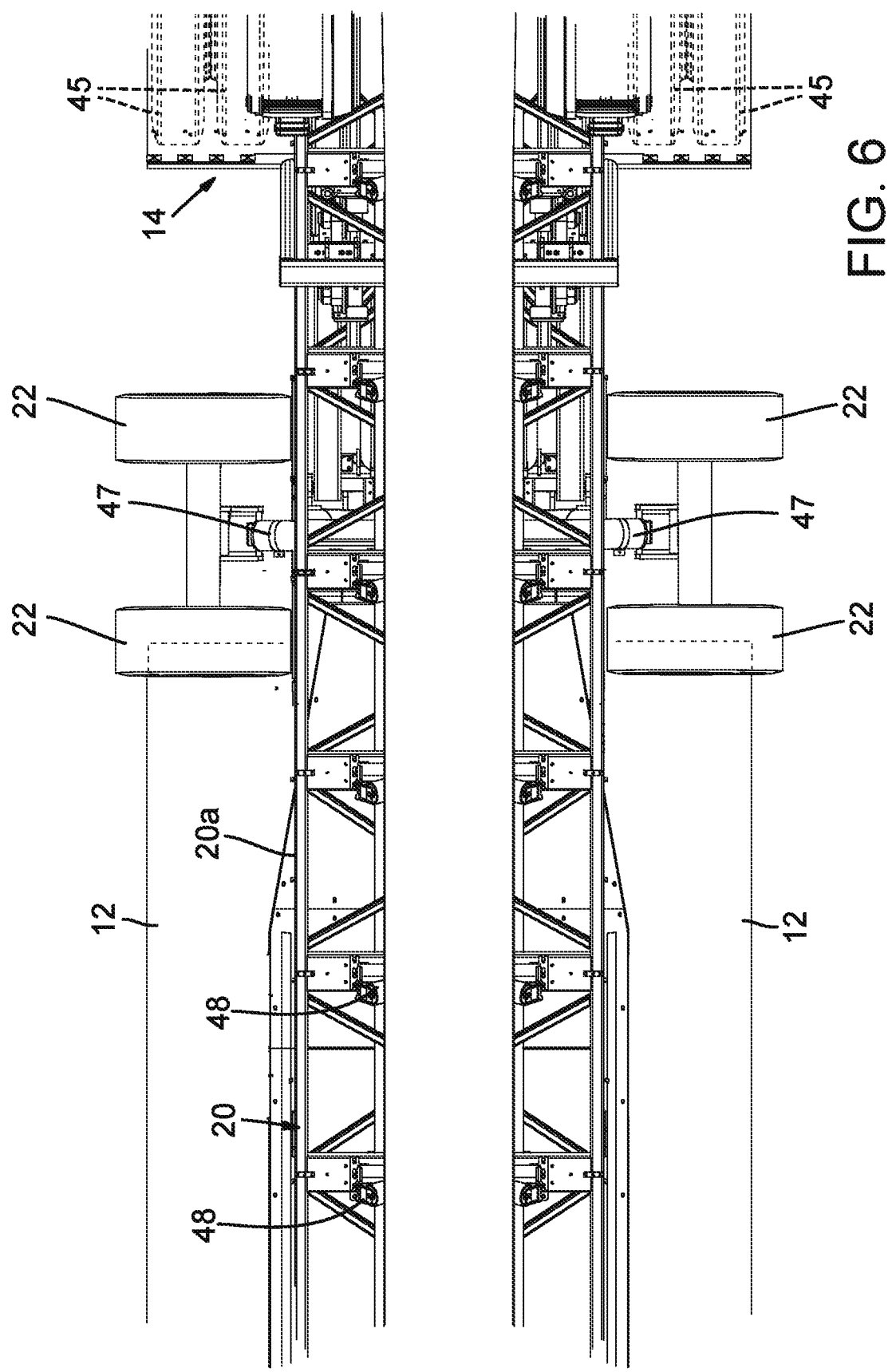
FIG. 6 is a top plan, fragmentary and enlarged view corresponding the FIG. 5 except that the wheels have been swiveled to their lateral or radial position, ready to be lowered to the ground for radial operation.

In order to position the radial drive wheel 22 for radial operation of the stacker, the wheels are swiveled from their longitudinal to their lateral disposition shown in FIG. 6. They are then pivoted downwardly through the use of hydraulic cylinders 47 to the position depicted in FIGS. 3 and 4. In this so-called radial or lateral disposition, wheels 22 can be used to convey stacker 10 in a radial direction so to form a large arc of a material instead of just a single large pile. Wheels 22 are normally provided with drive power, such as by hydraulic motors (not shown) to provide the operator with an easy system for radially conveying the stacker.

Stacker 10 is conventional in many respects, including a hopper 46, conveyor belt support rollers 48 (the belt itself has been deleted so other components are easier to see), a forward idler roller 50, and a pivot pad 52. The pivot pad is typically exchanged with the fifth wheel connection 16 when the stacker is transitioned to an operation mode from a transport mode. Alternatively, a combination fifth wheel connection/pivot pad (not shown) may be mounted to pivot between the two modes, with the fifth wheel connection first facing downwardly and then later to a position with the pivot pad facing the ground.

The operation of stacker 10 will now be described. As previously described, FIG. 1 depicts the stacker in a mode for highway or other roadway travel. Bogey wheels 45 are shown to be in contact with the highway, the tracks 12 are raised, and the front end of the stacker is shown to be mounted via fifth wheel connection 16 to tractor 18. In this position, forward stacker half 20b is folded over rearward stacker half 20a due to the retraction of conveyor folding cylinders 36.

To transition stacker 10 to an operational mode, fifth wheel connection 16 is replaced with pivot pad 52, or the combination fifth wheel connection/pivot pad is rotated so the pivot pad is facing downwardly. Folding hydraulic cylinders 36 are then extended to raise the forward half 20b of conveyor 20 to the open position shown in FIG. 2. Rearward-extending cylinders 32 may also be extended or retracted, depending on the disposition of the stacker to arrive at the position shown in FIG. 2.

To elevate conveyor 20 to the position shown in FIG. 2, arms 28 begin to be extended, and bogey 14 and its wheels 45 are elevated off the ground. This permits tracks 12 to lower to the ground. Extension of arms 28 continues until conveyor 20 is at the desired angle of elevation, such as that shown in FIG. 2. However, steeper or shallower angles may be desired, depending on the material being stacked and the desired height of the stacks.

Figure 7:
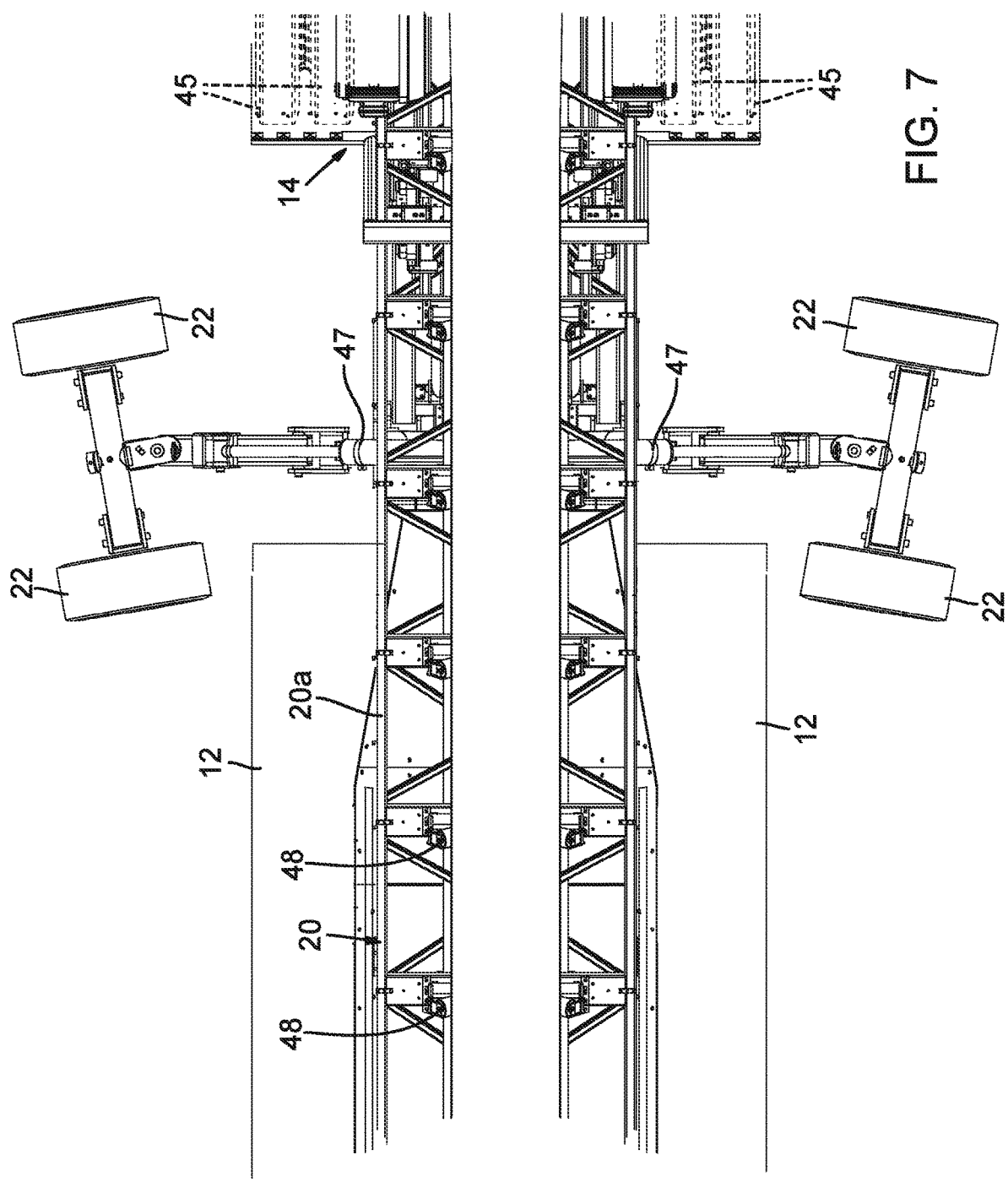
FIG. 7 is a top plan, fragmentary and enlarged view corresponding to FIG. 6 except that the pivotable wheels have now been lowered to enable the stacker to move in radial directions, as is shown in FIG. 4.

In this position shown in FIG. 2, with bogey wheels 45 and pivot pad 52 in raised positions, tracks 12 may be used to maneuver stacker 10 around the job site. However, to initiate stacking operations, pivot pad 52 should be resting on the ground. With pivot pad 52 and tracks 12 on the ground (not shown), the stacker may be operated; that is, material can be dropped into hopper 46 and conveyed up to the top of conveyor 20 to be stacked in a large stack. However, in order to maneuver the stacker such that the material can be stacked in an arced pile, wheels 22 on each side of the stacker are swiveled from longitudinally-extending (see FIG. 5) to laterally-extending (see FIG. 6). This may be constructed to be done manually or may be remotely powered. The pairs of wheels 22 are then pivoted downwardly through the use of hydraulic cylinders 47 on each side of the conveyor to the positions depicted in FIGS. 3, 4 and 7. In this position, stacker 10 can be laterally or more precisely radially conveyed to swing the top of the conveyor from side to side as necessary to form an arc-shaped pile.

Figure 5:
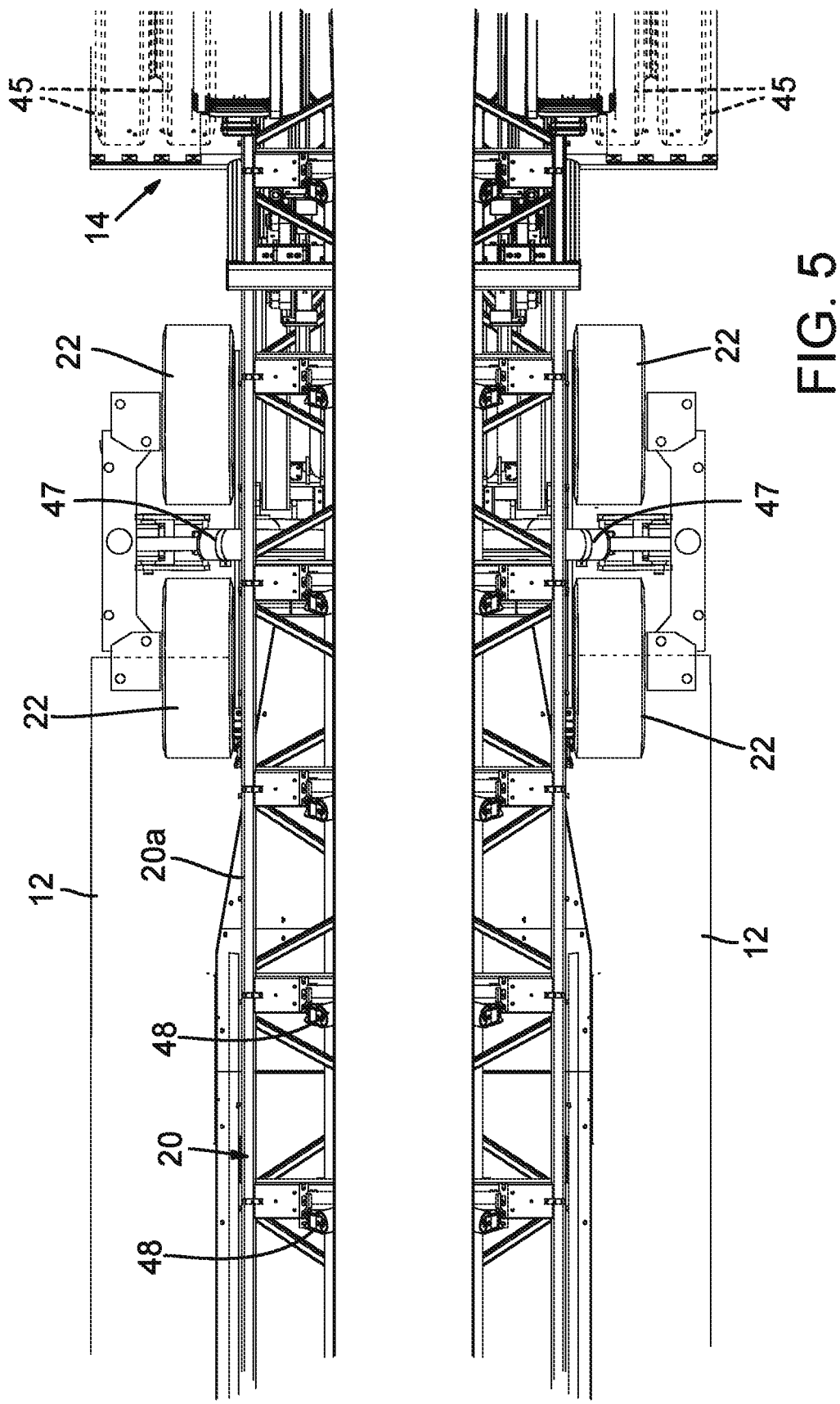
FIG. 5 is a top plan, fragmentary and enlarged view showing the pivotal wheels in their raised, longitudinally-disposed position ready to be conveyed down a roadway.

Once stacking operations are completed, hydraulic cylinders 47 can be activated to pivot wheels 22 back to their raised, laterally-extending positions shown in FIG. 6 and then swiveled to their raised, longitudinally-extending positions shown in FIG. 5. At that point, tracks 12 will be resting on the ground. Rearwardly-extending cylinder 32 might be extended to raise pivot pad 52 off the ground to maneuver the stacker around the job site or to simply move forwardly or rearwardly to form deeper (or wider) arc-shaped stacks.

When stacking operations are completed and stacker 10 needs to be moved to another site, support 34 is disconnected, and hydraulic cylinder 32 is extended to raise the rearward end of the stacker to a sufficient height to permit $5^{th}$ wheel connection to replace pivot pad 52, and $5^{th}$ wheel connection may be mounted to tractor 18. Prior to that, at the same time, or following that operation depending on the particular embodiment and the preference of the operator, pins 30 are removed from hydraulic cylinder arms 28, and the cylinder arms are retracted, lowering conveyor 20 to a substantially horizontal disposition. As this is done, tracks 12 are raised off the ground to the position depicted in FIG. 1. Prior to, at the same time, or following that operation, folding hydraulic cylinders 36 re retracted, causing the forward half 20b of conveyor 20 to be folded over the rear half 20a to the position shown in FIG. 1. Stacker 10 is now ready to be conveyed down a roadway to the next job site.

By designing stacker 10 as described and depicted herein, a tracked stacker with a radial capability can be conveyed down a roadway without having to load the stacker on to a flat bed or other truck. A radial conveying capability can also be built into the stacker if that feature is desired; or the tracks may be dispensed with entirely, simply using bogie wheels 45 and pivotable wheels 22 to maneuver the stacker. Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A tracked, portable stacker for stacking bulk material, comprising:
    a linear conveyor having a rear portion and a front portion and being designed to carry bulk material from the rear portion to the front portion;
    a continuous track system including a frame to which the conveyor is mounted, the track system having a pair of driven, parallel tracks to selectively support the stacker;
    a powered, telescoping cylinder arm mounted between the frame and the front portion of the conveyor for adjusting the front portion of the conveyor between a lowered position for transport and a raised position for stacking operations;
    a bogey mounted to the telescoping cylinder arm, the bogey including a plurality of longitudinally disposed wheels designed to be raised off the ground when the front portion of the conveyor is in a raised position, and lowered to the ground when the front portion of the conveyor is in a lowered position, wherein the bogey wheels elevate the tracks off the ground when the front portion of the conveyor is in the lowered position and the bogey wheels are in position to facilitate the stacker being conveyed down a roadway.

2. The stacker of claim 1, further comprising a pair of pivotable wheels that can pivot between a raised position in which they are off the ground and a lowered position in which they rest on the ground, and when the front portion of the conveyor is in a raised position and the pivotable wheels are in their lowered position, the pivotable wheels raise the tracks off of the ground so that they stacker can be radially conveyed to stack material in an arc; and
    a powered system for transitioning the pivotable wheels between the raised and lowered positions.

3. The stacker of claim 2 in which the pivotable wheels can also be swiveled when in a raised position between longitudinally- and radially-disposed positions.

4. The stacker of claim 1, further comprising a rearwardly-extending hydraulic cylinder system extending between the frame and the rear portion of the conveyor.

5. The stacker of claim 1, wherein the conveyor is in a substantially horizontal disposition when the front portion of the conveyor is in its lowered position.

6. A portable radial stacker for stockpiling bulk material, comprising:

a conveyor having a rear portion and a front portion and being designed to carry bulk material from the rear portion to the front portion;

a pair of pivotable wheels mounted to a frame that are pivotable between a raised position in which the pivotable wheels are off the ground and a lowered position in which the pivotable wheels rest on the ground to enable the stacker to be radially conveyed to stack material in an arc;

a powered, telescoping cylinder arm mounted between the frame and the front portion of the conveyor to selectively adjust the front portion of the conveyor between lowered and raised positions, the cylinder arm including a mid-portion disposed between the frame and the front portion of the conveyor; and a bogey mounted to the telescoping cylinder arm at the mid-portion thereof, the bogey including a plurality of longitudinally-disposed wheels designed to be raised off the ground when the cylinder arm adjusts the front portion of the conveyor to the raised position, and lowered to the ground when the cylinder arm adjusts the front portion of the conveyor to the lowered position.

7. The stacker of claim 6, further comprising a continuous track mounted to the frame to selectively support the stacker, wherein the track is elevated off the ground when the pivotable wheels are in their lowered position or the bogey is lowered to the ground.

8. A tracked mobile radial stacker comprising:

a conveyor having a rear end with the following mounted thereto: a pivot pad; a $5^{th}$ wheel connection; and a hopper for receiving bulk material to be stacked; and a forward portion designed to discharge the bulk material to form a stack;

a continuous track mounted to a frame;

a pair of pivotable wheels mounted to the frame and disposed to each side of the track, the pivotable wheels being pivotable between raised and lowered positions and being radially disposed when in the lowered position;

an extendable arm mounted between the frame and the forward portion of the conveyor, the arm having an underside;

a bogey mounted to the underside of the arm, the bogey including a plurality of longitudinally-disposed bogey wheels;

wherein the pivotable wheels raise the track off the ground when the pivotable wheels are in the lowered position to facilitate radial shifting of the conveyor with the conveyor pivoting on the pivot pad to form an arc-shaped stack; and wherein when the bogey is in its lowered position, the track is elevated off the ground.

9. The tracked mobile radial stacker of claim 8, further comprising a rearwardly-extending system extending from the frame toward the rear end of the conveyor.

10. The tracked mobile radial stacker of claim 9, further comprising a modular system mounted adjacent the rear end of the conveyor for holding an engine, and wherein the rearwardly-extending system is mounted to the modular system.

11. A stacker for conveying and stacking bulk material, comprising:

a conveyor frame having two lateral sides and being designed to support a conveyor belt having an upward facing side for carrying a load, the conveyor frame including forward and rear portions;

a hopper designed to receive the bulk material, the hopper being mounted to the rear portion of the conveyor frame to collect the bulk material and deposit it on the upward facing side of the conveyor belt to create a loaded belt;

a tracked drive carriage mounted to a carriage frame and supporting the conveyor frame, the drive carriage facilitating relocation of the conveyor frame around a work site, the drive carriage being mounted below and between the forward and rearward portions of the conveyor frame;

a pair of pivotable radial wheels mounted to the carriage frame and disposed on each lateral side of the conveyor frame, with a powered system for pivoting the radial wheels between raised and lowered positions;

a powered, arm mounted between the carriage frame and the forward portion of the conveyor frame, the arm being extendable for adjusting the forward portion of the conveyor frame upward for stacking operations and being retractable for adjusting the conveyor frame downward to a substantially horizontal position to facilitate relocating the stacker to another site, the arm having an upper side and an underside; and a plurality of longitudinally-extending wheels rotatably mounted to the underside of the arm such that when the arm is extended, the wheels are elevated off the ground and when the arm is retracted, the wheels contact the ground, thereby lifting the tracked drive carriage off the ground.

12. The stacker of claim 11, further comprising:

a drive module mounted to the rear portion of the conveyor frame independent of the drive carriage; and an engine for providing power to the stacker, and a drive pulley for pulling the loaded belt in a forward direction from a position adjacent the hopper, with the engine and drive pulley being mounted to the drive module, the engine providing drive power to the drive pulley.

13. A method for preparing a tracked stacker for stacking operations and for relocation down a roadway, comprising the following steps, not necessarily in the order recited:

selecting a conveyor with a conveyor frame having front, mid and rear portions;

positioning a carriage frame having continuous tracks, under the mid-portion of the conveyor frame;

mounting a powered, extendable arm between the carriage frame and the mid or front portion of the conveyor frame, the extendable arm having an upper side and an underside;

rotatably mounting a plurality of longitudinally-extending wheels to the underside side of the extendable arm;

extending the extendable arm to raise the front portion of the conveyor frame to prepare the conveyor frame for stacking operations; and when stacking operations are completed, retracting the extendable arm to lower the front portion of the conveyor frame to a generally horizontal position, causing the longitudinally-extending wheels to contact the ground and elevate the continuous tracks off of the ground, thereby readying the stacker for relocation down a roadway.

14. The method of claim 13, further comprising the step of providing a plurality of radially extending wheels mounted to the carriage frame, the radially extending wheels being pivotable between raised and lowered positions such that when the radially extending wheels are pivoted to their lowered position, they lift the continuous tracks off the ground, permitting the stacker to be radially conveyed to form an arced stack of bulk material.

15. The method of claim 13, further comprising the step of mounting a belt to the conveyor, and driving the conveyor belt from the rear to the front portion of the conveyor, the drive belt being mounted such that a drive pulley is designed to carry a load forwardly to be stacked.

* * * * *